(12) United States Patent
Hussaini et al.

(10) Patent No.: US 6,773,349 B2
(45) Date of Patent: Aug. 10, 2004

(54) VIDEO GAME CONTROLLER WITH INTEGRATED VIDEO DISPLAY

(75) Inventors: Saied Hussaini, Miami, FL (US); Marc Iacovelli, Miami, FL (US); Matthew Johnston, Boyds, MD (US)

(73) Assignee: Intec, Inc., Miami, FL (US)

( * ) Notice: Subject to any disclaimer, the term of this patent is extended or adjusted under 35 U.S.C. 154(b) by 0 days.

(21) Appl. No.: 10/208,013

(22) Filed: Jul. 31, 2002

(65) Prior Publication Data

US 2004/0023719 A1 Feb. 5, 2004

(51) Int. Cl.[7] ............................ A63F 13/00; A63F 9/24; G06F 17/00; G06F 19/00
(52) U.S. Cl. .............................. 463/38; 463/37; 463/39
(58) Field of Search .................. 463/30–44, 1, 463/16–25; 273/148 B; 370/294

(56) References Cited

U.S. PATENT DOCUMENTS

| | | | |
|---|---|---|---|
| D338,045 S | | 8/1993 | Rosen |
| RE35,786 E | * | 5/1998 | Ohara ......................... 463/44 |
| 5,759,100 A | | 6/1998 | Nakanishi |
| D411,530 S | | 6/1999 | Carter et al. |
| D414,484 S | | 9/1999 | Oikawa |
| D415,145 S | | 10/1999 | Oikawa et al. |
| D431,604 S | | 10/2000 | Chan |
| 6,347,796 B1 | * | 2/2002 | Grossman et al. ...... 273/148 B |
| 6,524,188 B2 | * | 2/2003 | Wang ........................... 463/37 |
| 6,540,614 B1 | * | 4/2003 | Nishino et al. .............. 463/40 |
| 6,585,596 B1 | * | 7/2003 | Leifer et al. .................. 463/39 |
| 2001/0012802 A1 | * | 8/2001 | Nishiumi et al. ............. 463/37 |

* cited by examiner

Primary Examiner—Teresa Walberg
Assistant Examiner—Robert Mendoza
(74) Attorney, Agent, or Firm—Liniak, Berenato & White

(57) ABSTRACT

A computer game controller with integrated video display device. The controller has a video device mounted or otherwise integrated into a hand held controller. A communication cable connects the controller with a stand alone computer game device. The cable establishes a communication link to facilitate the transmission of both command signals and audio/video signals between the controller and computer device. The integrated controller and video display device of the present invention provides two-way interaction with the stand-alone computer device within a single accessory device. The integrated controller and video display device may also incorporate a speaker or headphone jack to deliver additional audio stimulation.

2 Claims, 16 Drawing Sheets

VIDEO GAME CONTROLLER WITH INTEGRATED VIDEO DISPLAY

BACKGROUND OF THE INVENTION

1. Field of the Invention

The present invention relates to video game controllers and more specifically to an integrated controller and video display device for both controlling and displaying an interactive video game.

2. Description of the Related Art

Computer video games are well known in the art. Such devices range from small hand held all-in-one units, to larger stand-alone units which interact with stand alone controllers and stand alone video display devices. Small hand held devices are very portable. However, the graphics and sophistication game play are substantially inferior to stand alone units due limited processing power and associated peripherals. For more sophisticated play, stand alone computer units provide tremendous processing power and work with associated peripheral devices, such as a remote controller and television display in an attempt to bring the player a more dramatic gaming experience to that of hand held devices. One such stand-alone device is disclosed in U.S. Pat. No. 6,422,943 which is hereby incorporated by reference. These devices are widely available on the market and are well know in the art. FIGS. 8–9 depict such a conventional stand-alone computer video gaming device. A central stand-alone console contains all the essential processing components to run a computer game. A controller is connected to communicate operation control commands from a user. A separate display is connected to the gaming deice to display interactive video gaming images. As previously mentioned, this conventional arrangement is well known in the art.

With the tremendous commercial success of stand alone computer gaming systems, and entire peripheral market has emerged ranging from advanced video controllers, joysticks, steering wheel devices for racing games, multi-tap controllers, vibrating controllers, video stands, audio systems and the like. Programmable controllers are also available which allow a user to customize the operation of control buttons and to even store and retrieved such customized arrangements. One such device is disclosed in U.S. Pat. No. 5,759,100 which provides an LCDP display interface to facilitate programming the controller and is hereby incorporated herein by reference. The display device 18 of the '100 device is limited to an alphanumeric display in response to manual manipulation of program keys.

Stand alone computer gaming devices all require the use of a display device such as a television as shown in FIGS. 8–9. These devices are specifically suited for home use and do not lend them selves to portable use or in a manner which is intimate to the user. Hand held gaming systems incorporate an all-in-one processor, display and controller into a single to facilitate portability and intimate interaction with the game. One such system is disclosed in U.S. Pat. No. 5,184,830 and is incorporated herein by reference. However, as previously mentioned such systems do not provide the sophistication level of game play or graphics that stand alone systems can provide. Heretofore, the prior art has failed to integrate a display device into a controller for interaction with stand-alone computer game device.

SUMMARY OF THE INVENTION

The present invention is directed to a computer game controller with integrated video display device. The controller has a video device mounted or otherwise integrated into a hand held controller. A communication cable connects the controller with a stand-alone computer game device. The cable establishes a communication link to facilitate the transmission of both command signals and audio/video signals between the controller and computer device. The integrated controller and video display device of the present invention provides two-way interaction with the stand-alone computer device within a single accessory device. The integrated controller and video display device may also incorporate a speaker or headphone jack to deliver audio stimulation.

DETAILED DESCRIPTION OF THE PREFERRED EMBODIMENTS

Figure 1:
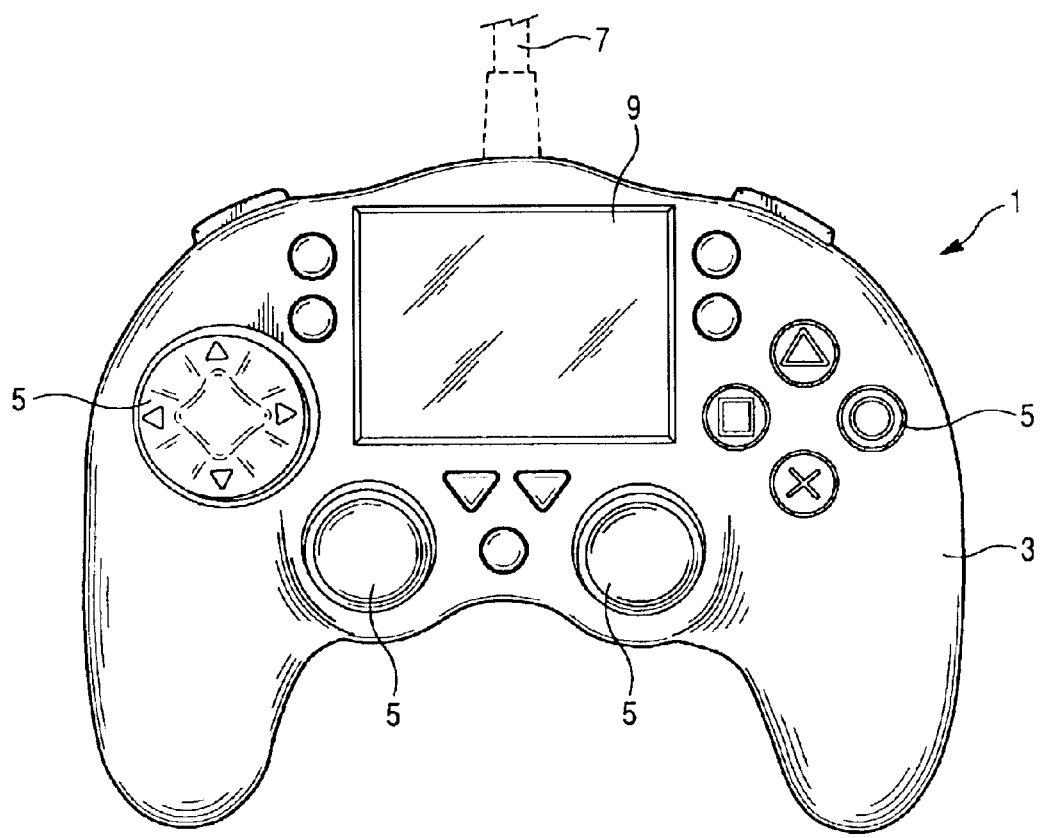
FIG. 1 is a plan view of a controller with integrated vide display device according to one embodiment of the present invention.

FIG. 1 depicts a video game controller with integrated video display 1 according to one embodiment of the present invention. A hand held unit 3 ergonomically formed to be held by a hand(s) of a user. The hand held unit 3 includes a plurality of operating members for manipulation of the users hand to facilitate interaction with game play. The controller may be the programmable type, include a vibratory member for heightened game play as well as lighted buttons etc. A communication cable 7, details of which will be explained later, is also provided to facilitate communication with a stand-alone computer gaming device. Such controllers and operating members are well known and within the knowledge of one of ordinary skill in the art.

The video game controller further incorporates an integrated display device 9. Preferably the display device is a color LCD (Liquid Crystal Display) type with associated driver circuitry to facilitate display of a video signal. Preferably the driver and other associated circuitry are contained within the body of the hand held unit 3. It is understood that small high resolution color LCD displays with associated circuitry are readily available and are known to one of ordinary skill in the art. Small high-resolution LCD displays have been incorporated into small hand held color televisions, video recorders, digital cameras, and other devices. Such readily available off the shelf LCD displays and associated circuitry can easily fit within the confines of the hand held unit 3 as contemplated by the present invention. In the embodiment of FIG. 1, a 3.2 inch LCD video display having a conventional 4:3 aspect ratio is be integrally molded into the front portion of the hand held unit 3 to form an integral one piece device. Off course both smaller and larger LCD display systems may be employed. The LCD display is positioned to be readily visible to the user when holding the hand held unit. The communication cable 7 contains both a conventional bundle for communicating operating control commands in response to manipulation of the operating members by the user and a separate bundle carrying video signals to the video circuitry of the LCD display.

State of the art stand alone computer gaming platforms also transmit low DC voltage across the communication bundle to power circuitry within the controller, power vibration devices, etc. Currently available LCDs do not consume much power and it is preferred to use the incoming low voltage DC source from the computer gaming system to rung the LCD display. According to the present invention, the console of the gaming platform is modified to provide a single connection point to connect the communication cable 7 including conventional control command communication bundle, a voltage source line and a video cable integrated into a single cable. The details of such a connection will be explained later. However, if such additional voltage is necessary, the hand held unit may incorporate a battery or other connection directly to an external voltage source.

Figure 2:
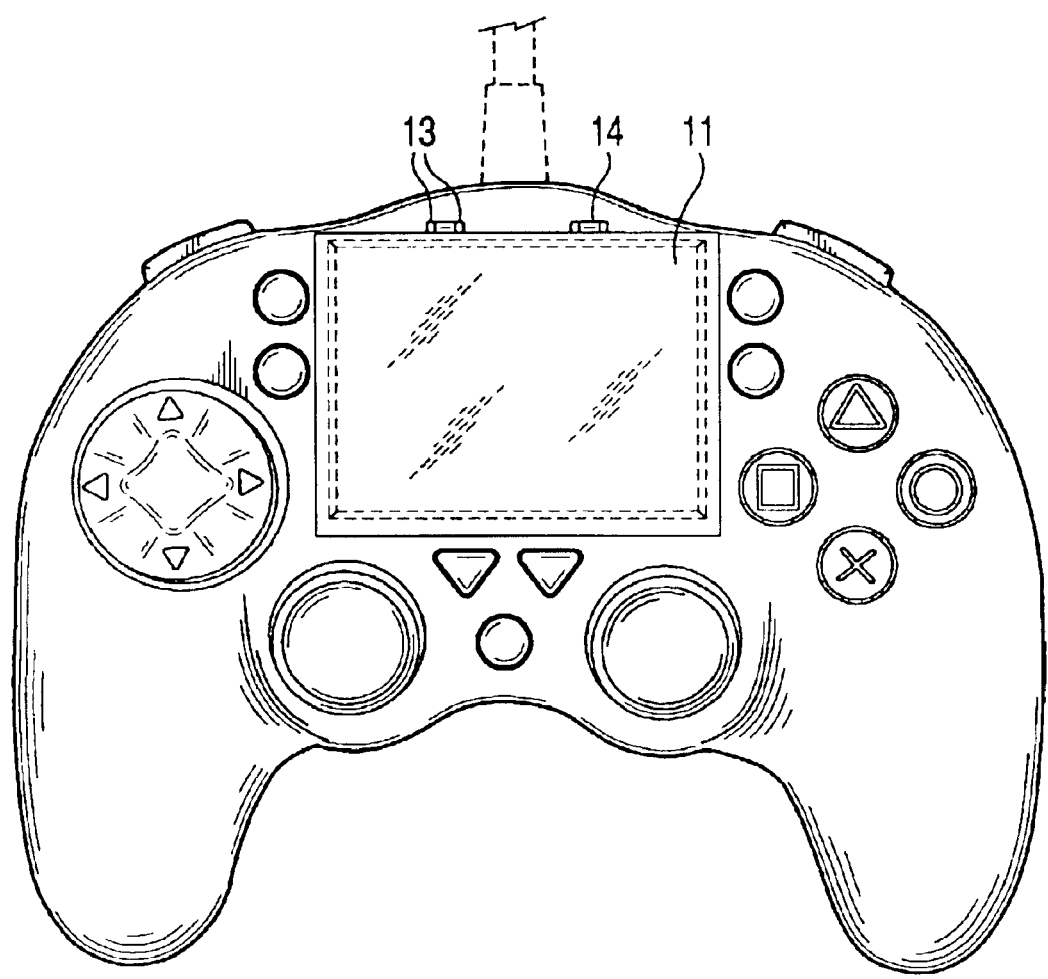
FIG. 2 is a plan view of a controller and integrated display device having a cover according to an alternate embodiment of the present invention.
Figure 3:
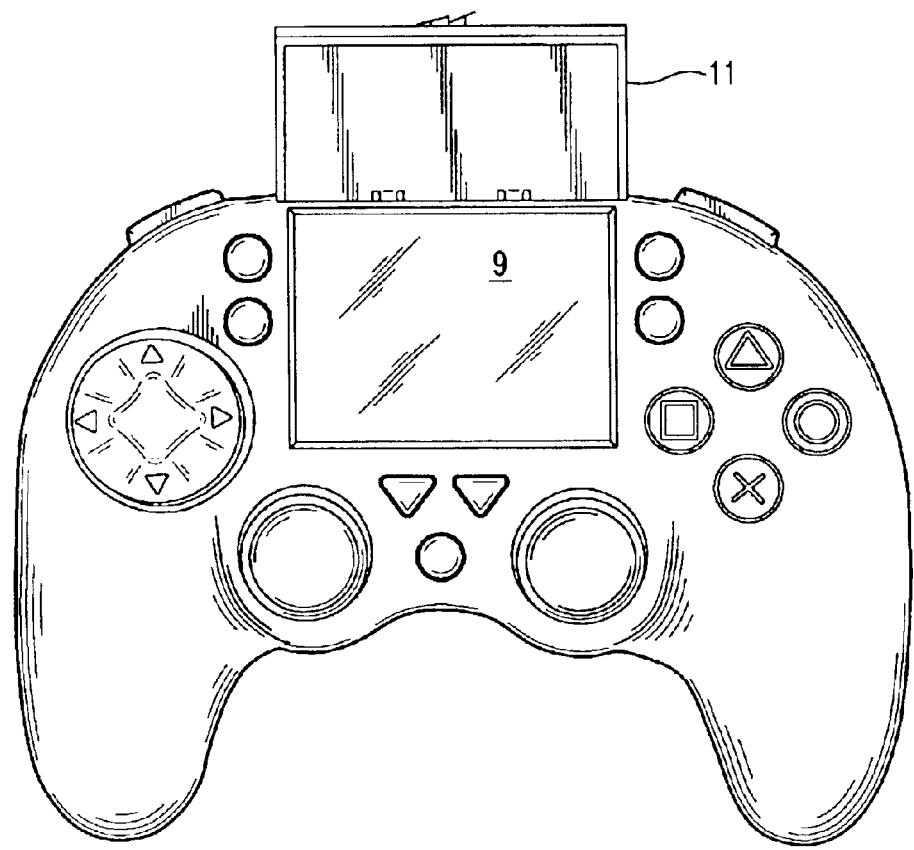
FIG. 3 is a plan view of the controller of FIG. 2 with the cover in an open position.
Figure 4:
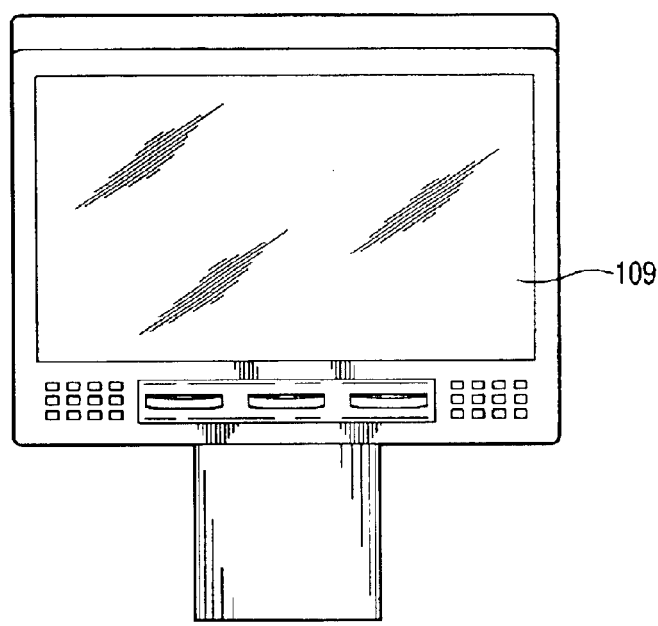
FIG. 4 is an exploded view of an alternate embodiment a removable display component.
Figure 4:
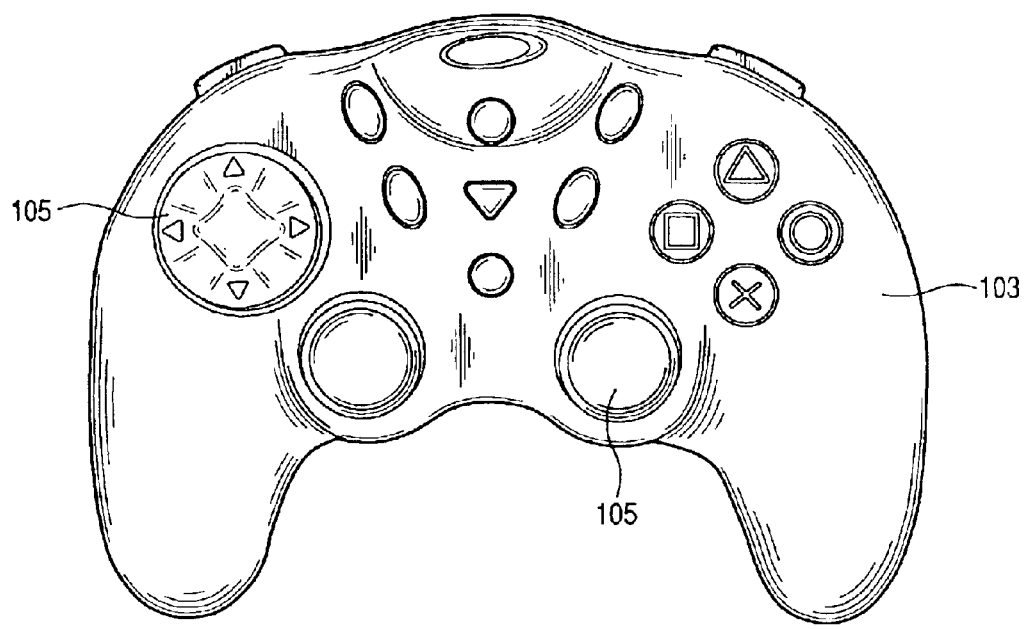
Figure 5:
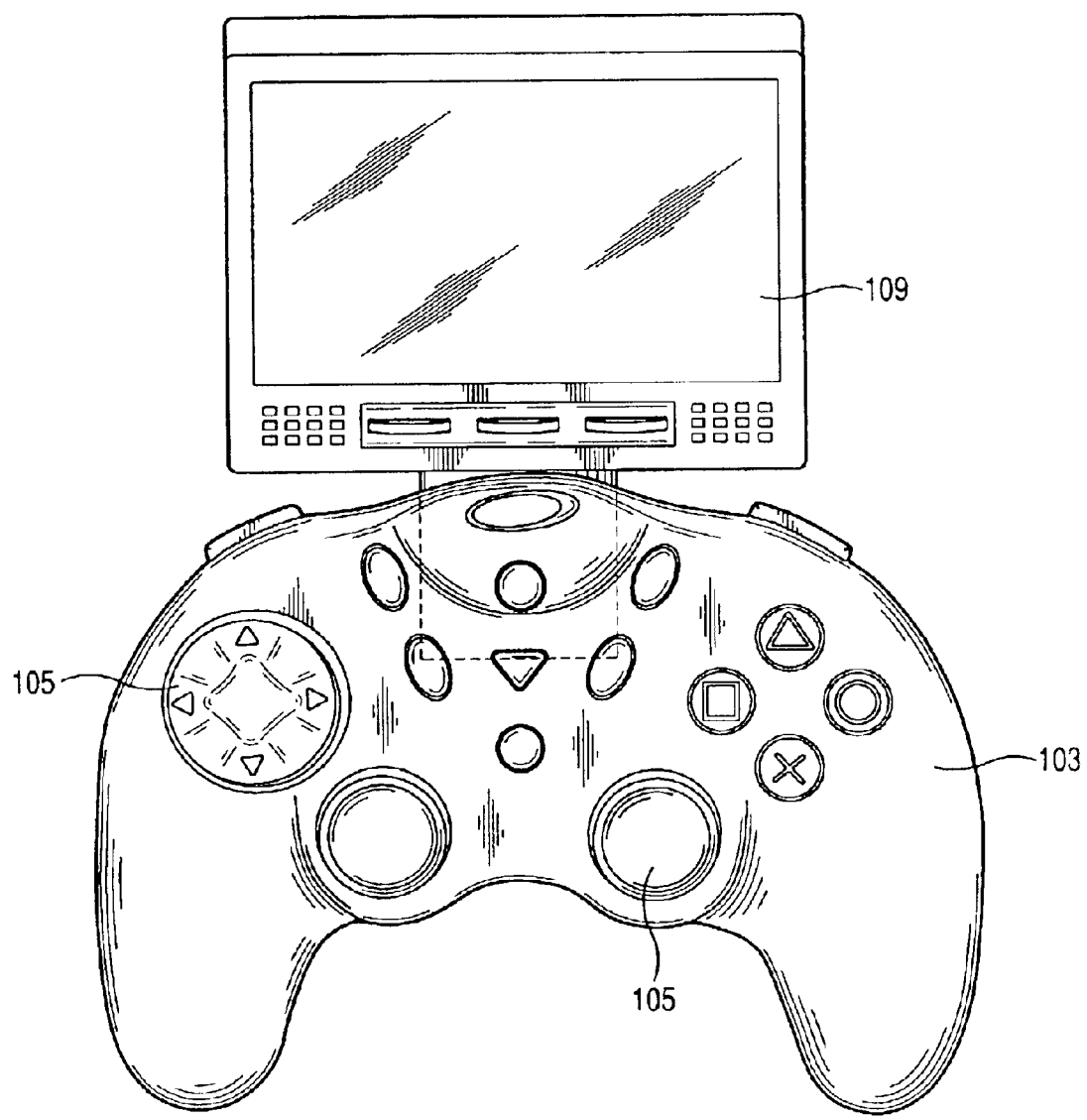
FIG. 5 is a view of the controller of FIG. 4 with the display component connected to the controller.
Figure 6:
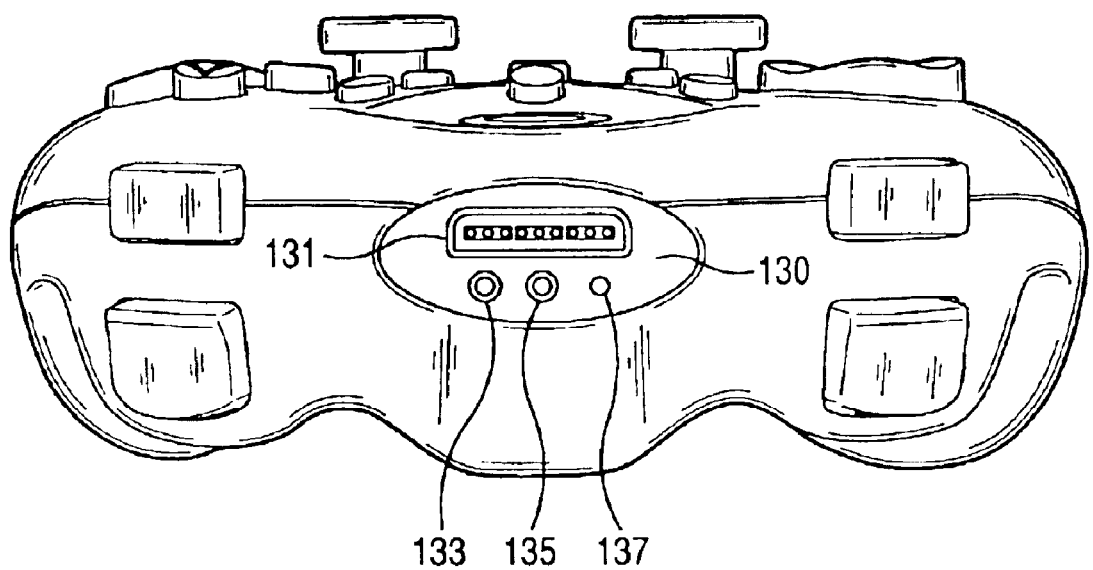
FIG. 6 is a front view of the controller portion of the embodiment of FIG. 4 exposing a connection port.

FIGS. 2–3 represents an alternate embodiment of the present invention. A cover 11 is pivotally mounted above the LCD display screen 9. Raised hinged members 13 may be simply formed into the molding of the hand held unit 3 for engagement with a pintle member 14 integrally formed in the cover. The cover 11 then may be installed simply by snap fitting the pintle 14 members into the hinge member 13. Preferably the cover member 11 is made of plastic or other material similar to the construction of the hand held body 3. FIG. 2 represents the cover in a closed position covering the LCD display 9. FIG. 3 depicts the cover 11 in an open position visually exposing the LCD display 9.

FIGS. 4–7 represents another alternate embodiment of the present invention having a removable display device 109. By allowing the removal of the display screen, the controller portion 103 can be utilized with a conventional stand-alone display device. The removable display device is preferably equipped with a pass through device 120 to facilitate a single connection point to the communication cable 107. The use of a pass through device 120 for the selective removal of the display device 109 facilitates the use of a common communication cable 7,107 for both embodiments where the display device 9 is unitarily formed with the hand held body 3 and the controller 103 having a removable display device 109. To achieve this, both the integral display device 9 of FIG. 1 and the removable disloyal device 109 of FIGS. 4–5 include a connection opening 130. The connection opening has a first port 131 with a female mounting arrangement and pinout to receive a male plug having corresponding pins to operatively form a connection of a control command communication bundle (such as those found within conventional controller cables of conventional gaming platforms such as the Playstation II by Sony). The connection opening 130 further has a video 133 and audio 135 female RCA jacks (or other known connections) to form a connection with an audio and video signal bundle for the controller embodiment of FIG. 1. (It is noted that for the controller of FIGS. 4–5, not such audio/video connections are necessary, as those communication signals will be directly ported to the LCD display and audio device within the removable device 109.) Alternately, a voltage source pinout jack 137 may exist to establish a connection to a voltage source flowing from the game console in additional to any voltage available through the first port 131.

Figure 7:
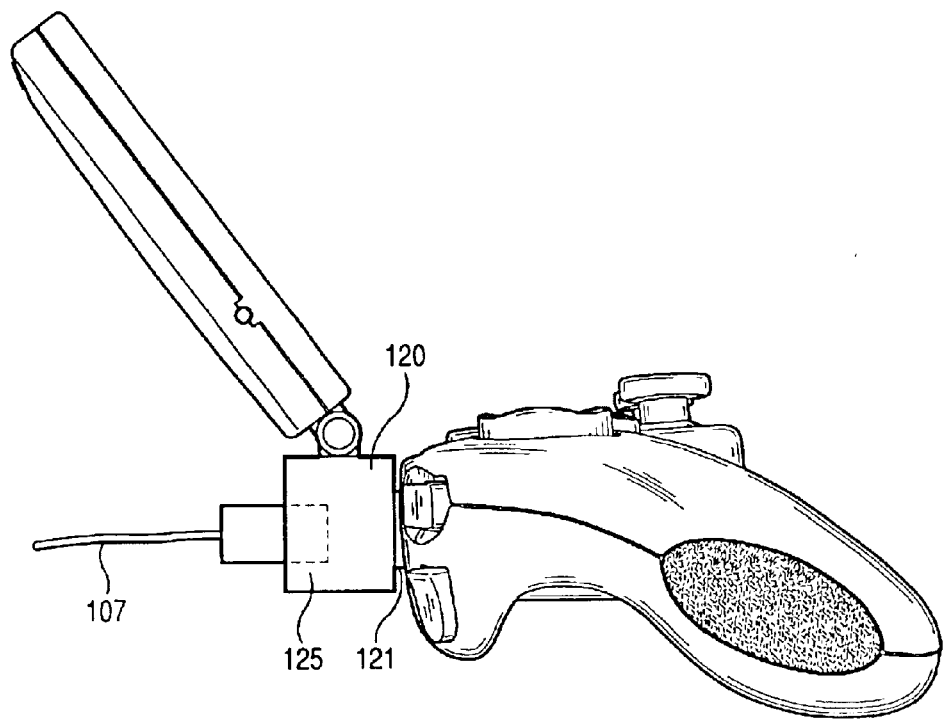
FIG. 7 is a side view of the embodiment of FIG. 4.
Figure 7A:
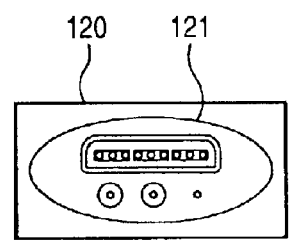
FIG. 7a is an isolated view of the pin out connection portion of the removable display of FIG. 7.
Figure 8:
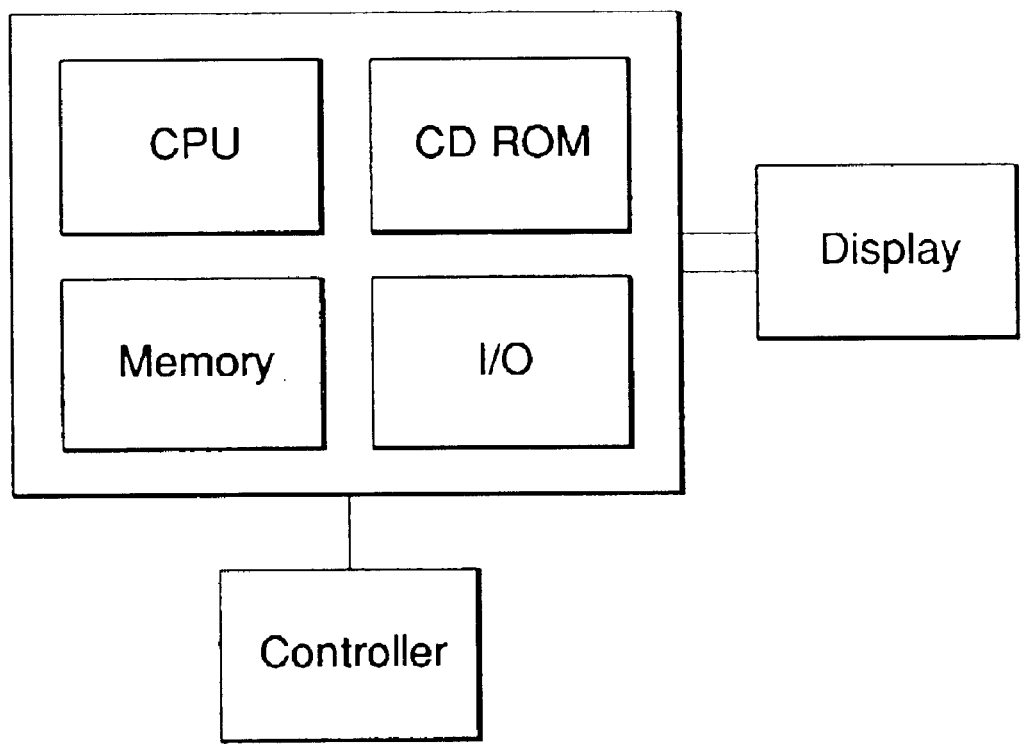
FIG. 8 is a schematic representation of a stand-alone video game system arrangement of the prior art.
Figure 9:
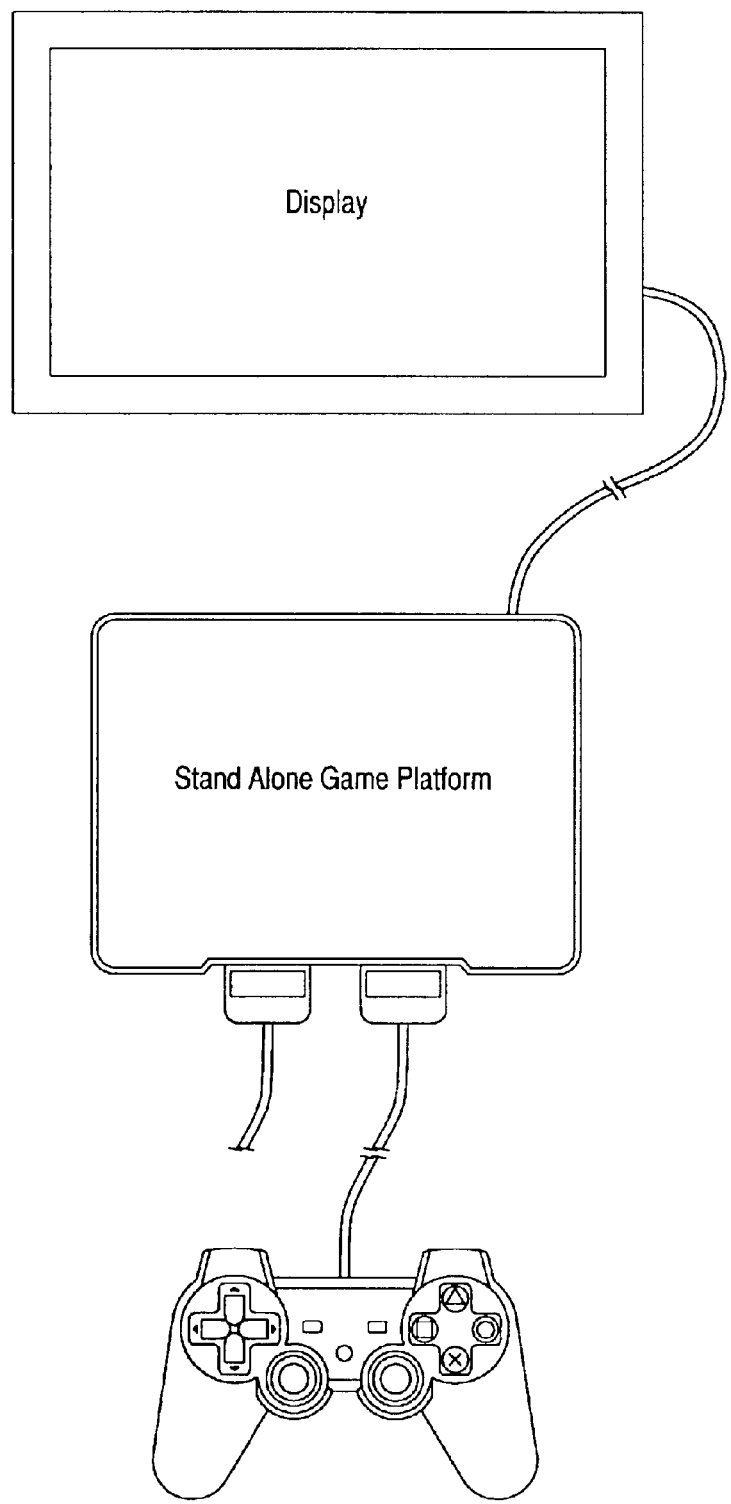
FIG. 9 is a plan view of a stand-alone video game arrangement according to the prior art.

The pass through portion 120 has an oval shaped stem 121 projecting from a central portion 125 to matingly fit within the opening 130. As can be seen in FIG. 7a, the oval shaped stem includes corresponding male connections (not labeled) to establish a connection with corresponding portions of the controller. On the opposite side of the central portion 125, a female connection opening is formed identical to opening 130 of the controller with associated connections portions identical to portions 131, 133, 135 and 137 of the controller. An electrical connection between the male and female pinout connections of the pass through device 120 is simply contained within the central body 125. The pass through device further simply routes the audio/video signals directly to the associated devices within removable display 109. Thus as can be readily seen in FIG. 7, the communication cable 107 may be either connected to the pass through device 120 of removable display 109 or directly to the opening 130 of the hand held unit 3. It is to be understood that the shape of stem 121 need not be oval. However, it is preferred to employ a non-circular shape to prevent any rotational movement between the controller and associated pass through device or cable bundle.

The pass-through device 120 is preferably pivotally mounted to the LCD display screen 109 to selectively customized viewing for the user. The pivotal connection further provides the ability to fold down the LCD display screen 109 on top of the controller 103.

Figure 10:
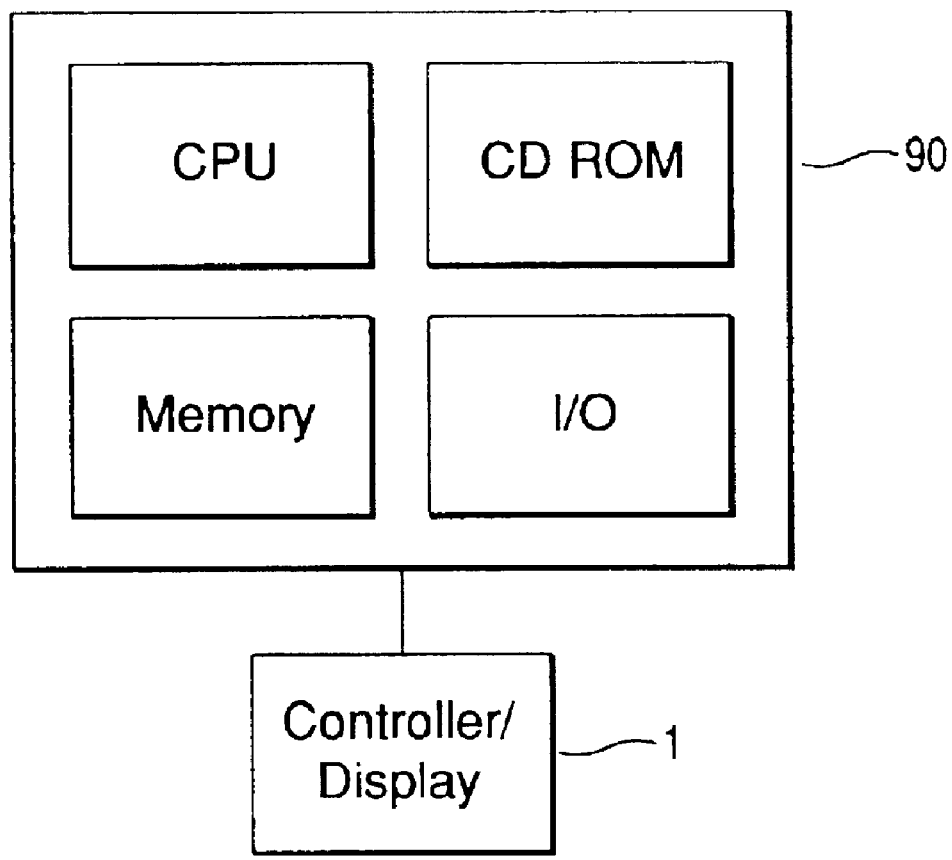
FIG. 10 is a schematic representation of a stand-alone video game system with an integrated controller/video display according to the present invention.
Figure 11:
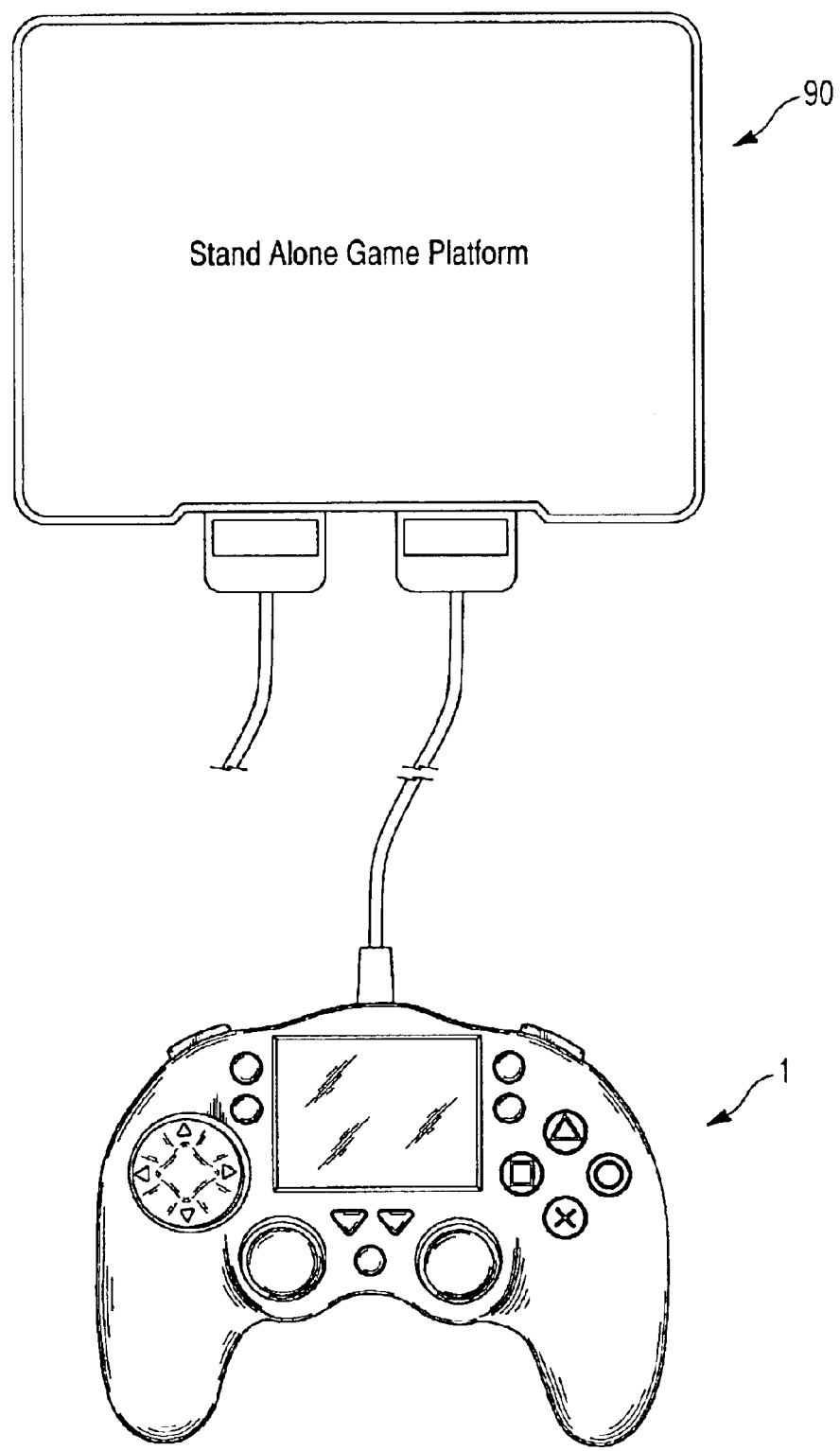
FIG. 11 is a plan view of a stand-alone video game system with an integrated controller/video display according to the present invention.

FIGS. 10–11 respectively depict schematic and plan views of the integrated video controller and display device 3 with a stand-alone computer gaming system 90. As can bee seen a single communication cable 7 incorporates both a video signal cable and a conventional control command bundle. In order to provide a single point connection to the stand-alone game system 90 the console of the game platform incorporates a connection portion a pinout substantially identical to the opening 130 and connection pinout portions 133, 135 and 137 of the controller 3. Such an arrangement facilitates the use of a single communication cable 7/107 having identical male pinouts and mounting portions on either end. However, it is to be understood that male/female portions may be interchanges so long corresponding portions of associated pieces match to complete the communication between the stand alone gaming platform 90 and either the controller of FIG. 1 or the pass through device 120 of FIG. 7.

Figure 12:
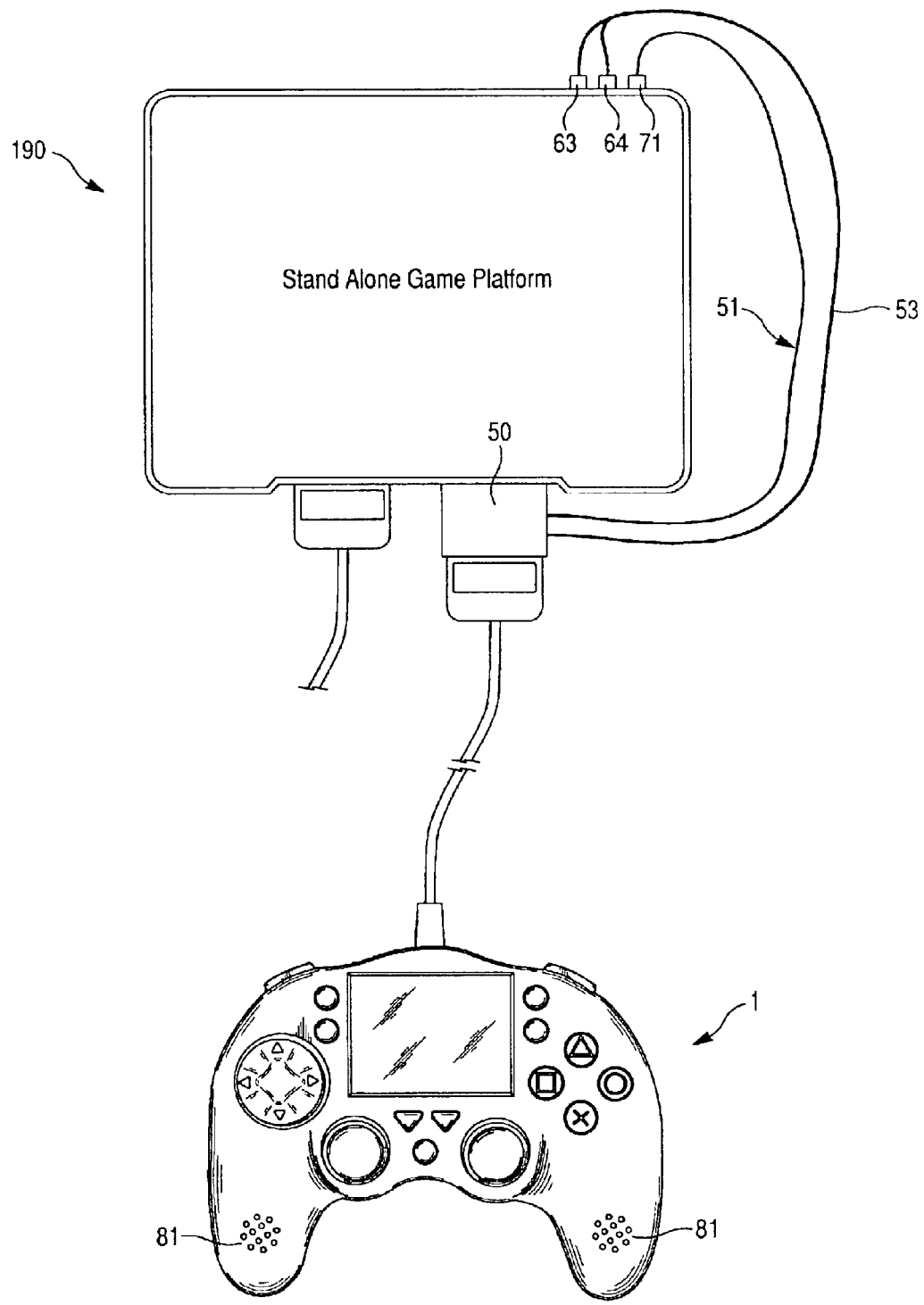
FIG. 12 is a plan view of a stand-alone video game system with an integrated controller/video display with adapter cable according to the present invention.

In order to enable the use of the video game controller 1 and integrated display device of the present invention with conventional stand-alone gaming platforms 190, an adapter cable 50 may be utilized. As can be seen in FIG. 12, the adapter 50 has a first end which mates with the communication cable 7,107. The adapter 50 serves to split the conventional command bundles and other bundles to facilitate separate connection to a controller interface of the conventional 190 device and the video/audio outputs.

While the present invention has been preferably described for connection of the communication cable 7/107 directly to the stand alone game console 90 through a single connection port, the controller 1, and integrated video display can be used with conventional gaming systems 190 having separate controller ports and video outputs. AS previously discussed, FIG. 12 depicts and alternate embodiment of the present invention. In order to facilitate connection to a conventional game platform 190, the adaptor 50 is employed. The adaptor 50 is simply a pass through device for operation command to connect to the conventional controller port of the game console. The pass through device bifurcates the command data bundle from audio, video or other lines such as a voltage source line into separate cables. As can be seen in FIG. 12. a video cable runs to the rear of the console to connect with an video output jack 71. The video output jack can be a conventional single line RCA jack, S-video or three-line connection as is well known in the art. A second audio line 53 extends to stereo audio output jacks 63, 64. The audio may be a mono or stereo line and is connect to a conventional RCA audio jack. The pass through portion of the adaptor 50 simply mirrors that of command port 131 with a female mounting arrangement and pinout to receive the male plug of the communication cable having corresponding pins to operatively form a connection of a control command communication bundle and audio/video jacks. Within 50 the control command bundle splits off from the audio/video bundle and the 50 has a male end simulating the male connection portion of a conventional controller port connection similar to the upper portion of the pas through device 121 of FIG. 7. The audio/video cables simply extend from 50 to the rear portion of the console and connect to respective ports as is conventional in the art. The controller/integrated display 1 further may contain speakers 81 within the controller as shown in FIG. 12 to provide audio as generated by the gaming circuitry.

Figure 13:
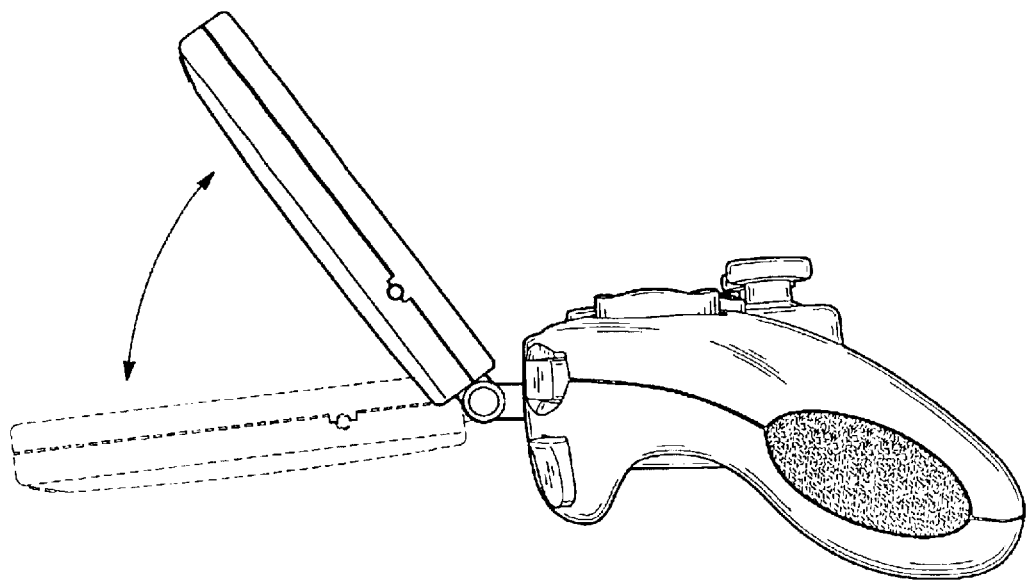
FIG. 13 is a side view of an alternate embodiment of the present invention with a pivotal display -screen.

FIG. 13 depicts a controller 201 with a display device 209 pivotally secured to the hand held unit 203. A display device 201 is simply secured to the hand held unit 203 with a simple hinge device 265 with corresponding portions integrally formed with the body of each of the hand held unit 203 and the display device 209. The display device 209 may then be pivoted towards and away from a user handling the controller 201 to optimize viewing comfort. Alternately, the display device 209 may connected via a ball and socket connection to facilitate an additional degree of freedom to allow both pivotal and rotational movement of the display device 209 relative to the hand held unit 201. A stop member is preferably integrated into the pivotal connection 265 to limit the extent of rotation. The particular structure of the pivotal connection 265 is not critical to the present invention so long as the display device 209 can move relative to the hand held unit 203 without disturbing communication between the LCD display the circuitry within the hand held unit 203. In this embodiment, the communication cable may extend directly from the hand held unit 203 to the stand alone gaming device and a smaller communication cable simply extends through the pivotal connection 265 to interconnect the display device 209 and the circuitry contained within the hand held unit 203.

Figure 14:
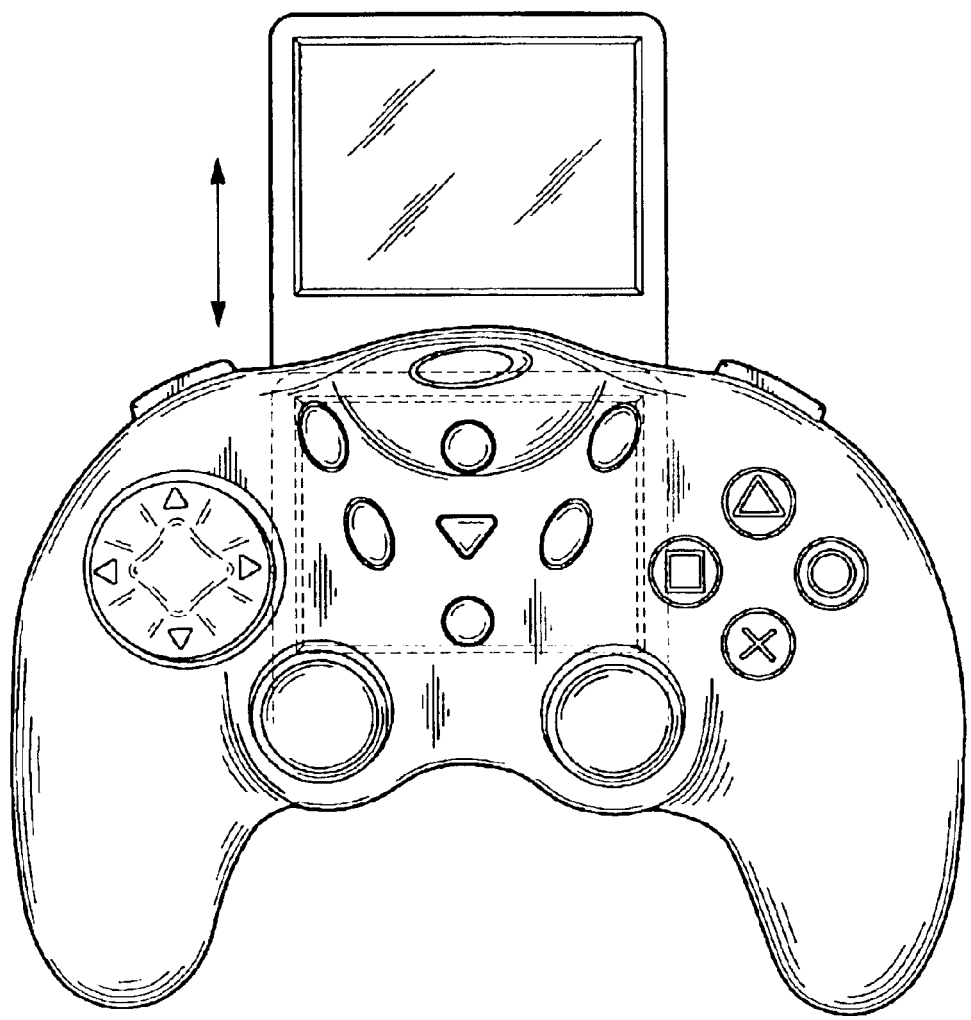
FIG. 14 is a top plan view of an alternate embodiment of the present invention having a retractable display screen.

FIG. 14 represents an alternate embodiment. The integrated controller 301 includes a retractable display device 309. In the present embodiment, the display device 309 preferable slides in and out of the hand held unit 303. The sides of the LCD display 109 may be disposed within a channel track integrally formed into the body of the hand held unit 303. A stop member may simply be formed on the inside edge of the display device 109 to prevent the display device from dislodging from the hand held unit 203. Here again, the specific structure of the retractable connection between the display device 309 and the hand held unit 303 is not crucial so long as the display device is permitted to be displaced without effecting the ability to display video images. The display device 309 may further be pivotally connected to a portion that slides within the channels formed in the hand held unit 303 to provide additional positional control of the display device 309 relative to the hand held unit 303. Such an arrangement not only provides customized positional viewing control but facilitates protection of the display device 309 when not in use.

Figure 15:
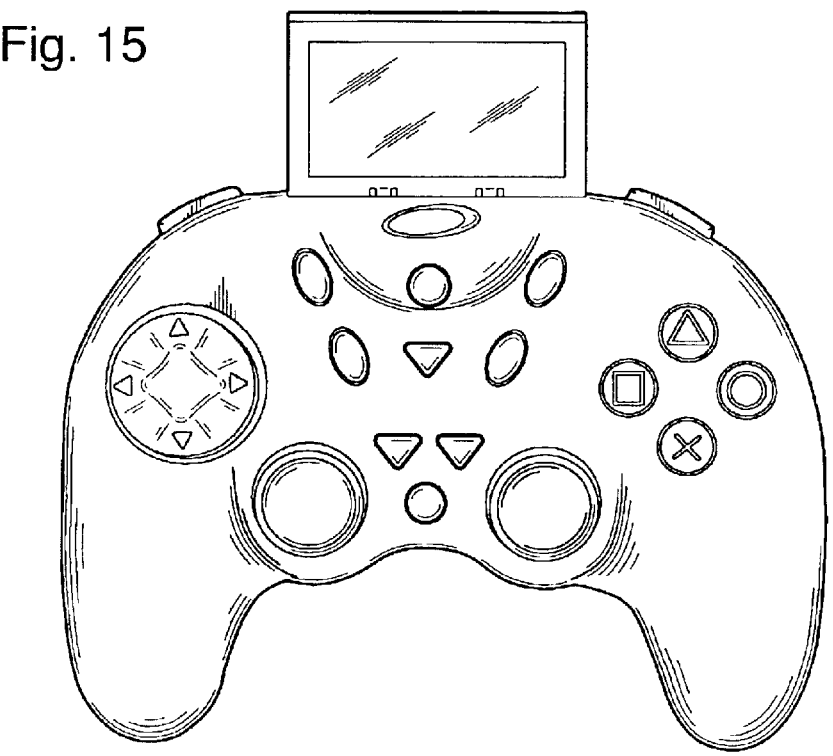
FIG. 15 is a top plan view of an alternate embodiment of the present invention having a flip up display screen in the closed position.
Figure 16:
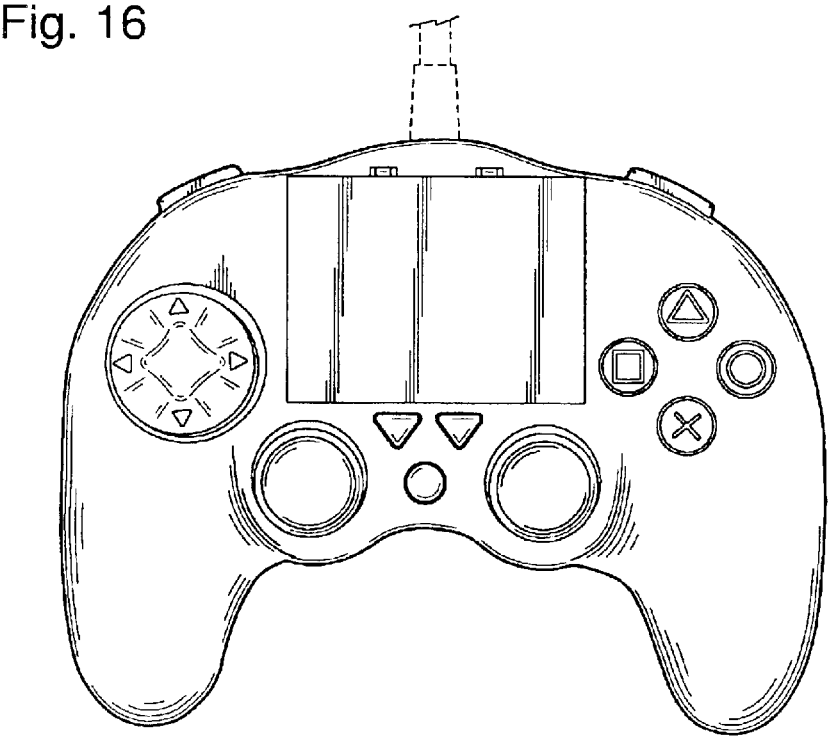
FIG. 16 is a top plan view of the embodiment of FIG. 15 in a raised position.

FIGS. 15–16 represents yet another embodiment of the present invention. According to the present embodiment, the display device 409 is pivotally connected to a top portion of the hand held unit 403. Such an arrangement facilitates a flip up display device. When the display device is on the closed position, the back of the display device 409 serves as a cover to protect the LCD display. The display device 409 may simply flip up to an optimized viewing position during use. The display device 409 may simply be pivotally connected to the top potion of the hand held unit 403. Raised hinged members 413 may be simply formed into the molding of the hand held unit 403 for engagement with a pintle member 414 integrally formed display device. A communication cable may simply extend from the display device 409 to within the circuitry within the hand held unit 403. Preferably the body of the display device is made of plastic or other material similar to the construction of the hand held body 403 and suitable for integrally forming the respective pintle and hinge members unitarily with their associated component.

Figure 17:
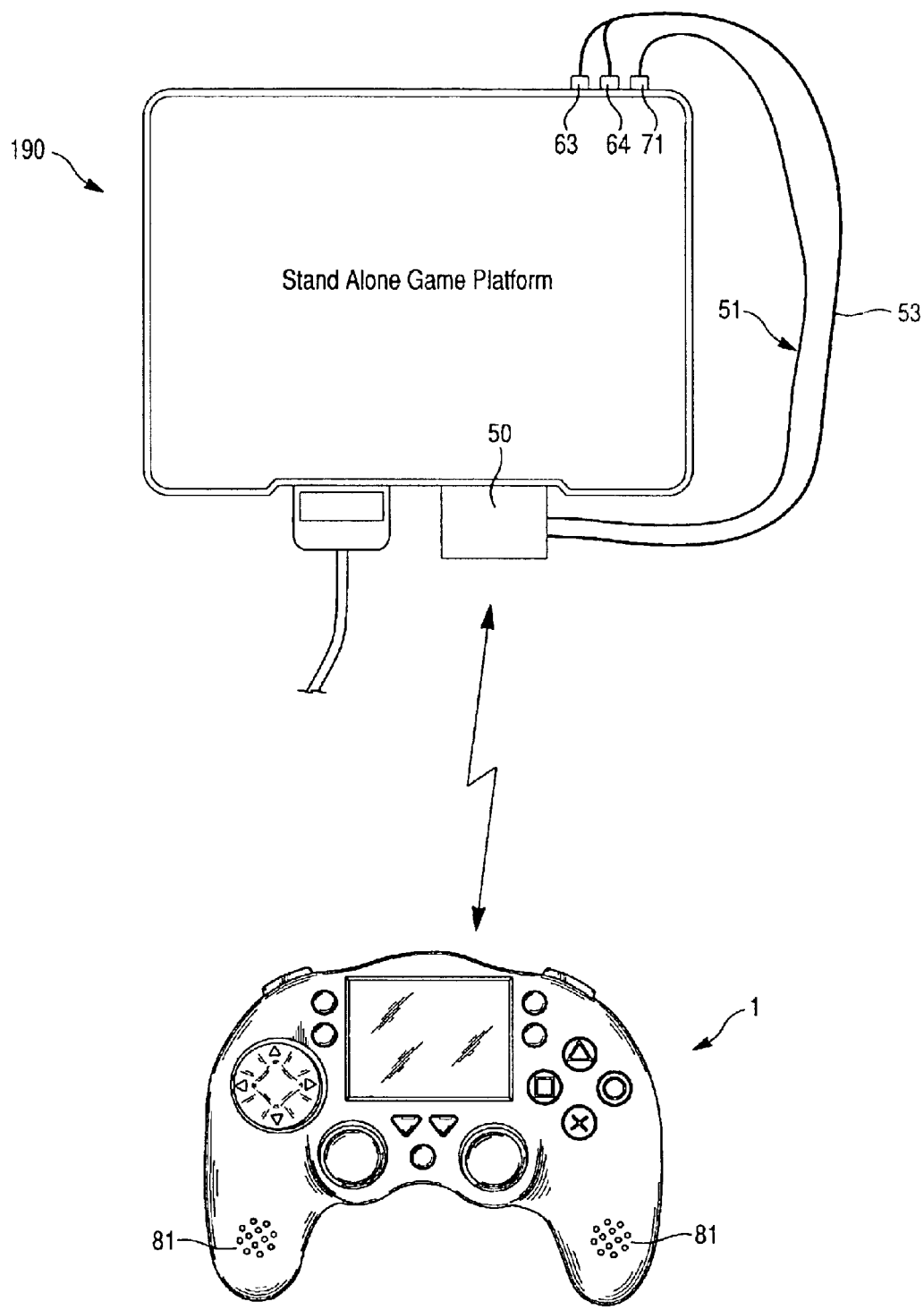
FIG. 17 is a plan view of a stand-alone video game system with a wireless integrated controller/video display according to an alternate embodiment of the present invention.

While the foregoing invention has been shown and described with reference to a preferred embodiment, it will be understood by those possessing skill in the art that various changes and modifications may be made without departing from the spirit and scope of the invention. For example, FIG. 17 contemplates a wireless embodiment where the integrated controller 501 communicates with the stand-alone console 590 via radio waves. A transmitter 550 may simply be inserted into a controller port and further connected to audio/video outputs of the console. Wireless controllers are known in the art. However, such controllers are limited to communicating operational data between the stand-alone console and controller device. The transmitter of the present invention transmits not only operational commands between the controller and stand-alone game console, but video and audio signals as well. Thus the integrated controller is equipped with a receiver to receive such signals. In this embodiment, the hand held unit is equipped with batteries to provide sufficient power to run the display device 509 and associated circuitry within the hand held unit. The associated components are then neatly arranged within the confines of the hand held unit to provide a complete package to interact with the gaming processor of the stand-alone unit 590. Such an arrangement will allow multiple players to compete without having to view a common screen. In fact, two players do not even have to be within the same room to engage in a common game adventure. It has been demonstrated that communication within the range of 1.2–2.4 Gigahertz is sufficient to transmit the necessary command controls and audio/video data to facilitate a wireless remote interaction between the stand-alone computer game console 590 and the integrated controller and video display 501 of the present invention.

What is claimed is:

1. A video game controller with integrated video display for interaction with a stand-alone computer gaming system, said controller comprising:

a hand held body having a plurality of operation members logistically positioned for manipulation by a user, a display device secured to said hand held body, said display device being capable of displaying video images generated by said stand alone computer gaming system; and at least one communication cable operatively connected to said hand held device and provided to transmit operation commands to said stand alone computer gaming system in response to manipulation of said operation members by said user and to receive video signals from said stand alone video gaming device to facilitate communication to said display device to display images of an interactive video game generated by said stand alone computer game system on said display device;

wherein said display device is removably secured to said hand held body to facilitate operation of said controller with said stand alone computer gaming system utilizing a second stand alone video display device independent of said integrated display device, and wherein said removably secured display device includes a pass through connection device to provide an intermediate connection of said communication cable with a connection portion of said hand held body.

2. A video game controller with integrated video display for interaction with and in combination with a stand-alone computer gaming system, said controller comprising:

a hand held body having a plurality of operation members logistically positioned for manipulation by a user, a display device secured to said hand held body, said display device being capable of displaying video images generated by said stand alone computer gaming system; and said combination further including;

a wireless communication device provided to transmit operation commands to said stand-alone computer gaming system from said controller in response to manipulation of said operation members by said user and to transmit video signals from said stand alone computer gaming system to said display device secured to said controller and to display images of an interactive video game generated by said stand alone computer gaming system on said display device without a wired connection between said controller and said stand-alone computer gaming system, said wireless communication device including an adapter connected to each of a video output port and a separate controller port of said stand alone computer gaming system, said adapter both transmitting and receiving signals between said stand-alone computer gaming system and said controller to facilitate said wireless connection therebetween.

* * * * *